United States Patent
Thomas (10) Patent No.: US 9,889,787 B2
(45) Date of Patent: Feb. 13, 2018

(54) MOBILE AUXILIARY TRANSFER LIFT CADDY

(71) Applicant: Marc S. Thomas, Brownville, NY (US)

(72) Inventor: Marc S. Thomas, Brownville, NY (US)

( * ) Notice: Subject to any disclaimer, the term of this patent is extended or adjusted under 35 U.S.C. 154(b) by 105 days.

(21) Appl. No.: 15/132,306

(22) Filed: Apr. 19, 2016

(65) Prior Publication Data
US 2017/0297472 A1    Oct. 19, 2017

(51) Int. Cl.
| | |
|---|---|
| *B65G 67/02* | (2006.01) |
| *B60P 3/07* | (2006.01) |
| *B66F 3/46* | (2006.01) |
| *B66F 7/06* | (2006.01) |
| *B66F 7/00* | (2006.01) |

(52) U.S. Cl.
CPC .............. *B60P 3/07* (2013.01); *B65G 67/02* (2013.01); *B66F 3/46* (2013.01); *B66F 7/00* (2013.01); *B66F 7/0625* (2013.01)

(58) Field of Classification Search
CPC ... B65G 67/02; B66F 3/46; B66F 7/00; B66F 7/0625; B66F 2700/12; B66F 2700/123
USPC .......... 414/12, 254, 349, 373, 391, 402, 611
See application file for complete search history.

(56) References Cited

U.S. PATENT DOCUMENTS

| | | | |
|---|---|---|---|
| 2,369,838 A | 2/1945 | Minnis | |
| 2,417,612 A | 3/1947 | Provenzano | |
| 3,011,663 A * | 12/1961 | Decker | B65G 67/00 414/391 |
| 3,271,006 A | 9/1966 | Brown et al. | |
| 3,825,131 A * | 7/1974 | Batson | B65G 67/12 414/391 |
| 4,049,135 A * | 9/1977 | Glassmeyer | B65D 88/126 108/55.1 |
| 4,077,532 A * | 3/1978 | Bryan | B60P 1/52 108/55.3 |
| 4,086,982 A * | 5/1978 | Hernick | B66F 7/00 187/206 |
| 4,854,805 A | 8/1989 | Althoff et al. | |
| 5,004,075 A | 4/1991 | Ascenzo | |
| 5,012,879 A | 5/1991 | Bienek et al. | |
| 5,306,109 A * | 4/1994 | Kreuzer | F16M 11/041 414/343 |
| 5,425,612 A * | 6/1995 | Ebstein | E04H 6/186 414/231 |
| 7,163,087 B2 | 1/2007 | Putnam | |
| 7,891,446 B2 | 2/2011 | Couture et al. | |
| 8,128,064 B2 * | 3/2012 | Franzen | B60P 1/6445 254/2 C |

(Continued)

FOREIGN PATENT DOCUMENTS

JP          05024660 A  *  2/1993  ............. B65G 67/02

*Primary Examiner* — James Keenan
(74) *Attorney, Agent, or Firm* — Bernhard P. Molldrem, Jr.

(57) ABSTRACT

A mobile lift caddy is configured to remove a vehicle from a primary lift while the vehicle is elevated above the workplace floor and then transport the vehicle to another location. The mobile lift caddy is dimensioned to fit between vertical lift posts of the primary lift. A mobility drive arrangement moves the caddy under operator control to and from the workplace location. Caddy lift arms are configured to accept a portion of removable lift pad assemblies at the lift arms of the primary lift, to lift out the lift pad assembly with the vehicle supported on the lift pads.

11 Claims, 10 Drawing Sheets

(56) References Cited

U.S. PATENT DOCUMENTS

| | | | |
|---|---|---|---|
| 8,465,244 B2* | 6/2013 | Lanigan, Sr. | B65G 63/065 |
| | | | 414/391 |
| 9,428,284 B2* | 8/2016 | Rawdon | B64F 1/32 |
| 2009/0136329 A1 | 5/2009 | Roberts | |
| 2010/0284772 A1 | 11/2010 | William | |
| 2015/0098776 A1* | 4/2015 | Li | B65G 63/025 |
| | | | 414/349 |
| 2016/0159266 A1* | 6/2016 | Hecky | B60P 1/02 |
| | | | 414/389 |

* cited by examiner

MOBILE AUXILIARY TRANSFER LIFT CADDY

BACKGROUND OF THE INVENTION

This invention relates to hoists and lifts for raising a motor vehicle above the floor of a workplace, and is more particularly concerned with mobile lift and transport devices for a transferring a vehicle from a primary lift to another location. The invention is more particularly concerned with an arrangement in which the primary lift employs modular removable vehicle lift pads that are positioned in the lift arms of the primary lift and which a mobile lift and transport caddy can accept to lift the vehicle lift pads and the vehicle off the primary lift to free the primary lift for other work.

Automotive repair shops and automotive body shops employ lifts or hoists to raise the vehicle above the workplace floor for purposes of allowing the workers access to the lower portions of a vehicle or to relieve weight from the vehicle suspension to permit repairs to wheels, brakes, etc. It frequently occurs that an automotive repair is only partly completed when the work need to be interrupted, e.g., to await arrival of a replacement part. When that happens the lift or hoist can be tied up and idled, and not be available for repairs or maintenance to another vehicle. However, the partly-repaired vehicle cannot simply be lowered from the lift and moved on its own wheels, especially if it is missing some portion of its suspension.

Accordingly, there has been a need to provide an auxiliary lift or caddy to remove the partly-repaired vehicle from the primary lift and permit that primary lift to be available for repair of another vehicle. A related need is for the auxiliary lift or caddy to be able to move the first vehicle back to the primary lift so that repairs or maintenance on it can be continued.

Currently there are motor-driven wheeled dollies that can support a single wheel of a vehicle while the vehicle is on the lift, but cannot remove the vehicle from the lift or transport the partly-repaired vehicle. An example of such a dolly is described in Roberts Publ. No. US 2009/0136329. Vehicle-lifting jacks also exist, capable of supporting points on the frame of a vehicle and lifting it so it can be transported, but these do not lift a vehicle from a primary lift or hoist. An example of such an arrangement is described in William Publ. No. US 2010/0284772.

No arrangements are currently available that are suited for lifting a vehicle off a fixed, primary lift or hoist, and transporting the vehicle out of a service bay.

OBJECTS AND SUMMARY OF THE INVENTION

Accordingly, it is an object to provide a novel mobile lift system for moving a vehicle (e.g., passenger car, light truck, motorcycle, etc.) from a primary stationary lift device to another location, e.g., to a different service bay, or vice versa, and which overcomes the drawbacks of the prior art.

A more specific object of this invention is to provide a mobile machine or caddy that is a sub-system of an larger lift system that may consist of one primary stationary lift or hoist, or a number of primary lifts.

Another object is to provide the lift system with transferable lift pads or support pads that allow the mobile machine or caddy to pick up the lift pads and vehicle directly from the primary lift.

A further object is to provide an auxiliary lift caddy that can maneuver beneath the chassis or frame of a vehicle on the primary lift and between the primary lift posts, and on which lift arms can be precisely maneuvered to engage the vehicle lift pads and remove the lift pads and vehicle from the stationary primary lift and lock them in place on the lift arms of the mobile machine or caddy.

A still further object is that the vehicle lift pads are configures so that when the lift caddy engages predetermined points on the primary lift the lift arms of the caddy disengage the transferable pads from lift pads from the primary lift's lift arms, and lock the lift pads onto the caddy lift arms.

A related object is that the lift pads are designed so that the sequence can be reversed, that is, moving the vehicle and the associated lift pads from the caddy to the stationary primary lift or to another primary lift in a different repair bay.

Yet another object is that once the vehicle and the lift pads are secured onto the caddy or mobile lift machine, the caddy can transfer the vehicle, under the caddy's own power (under wired or wireless control) away from the stationary primary lift to a different location.

According to an aspect of the present invention, a vehicle lift arrangement employs one or more primary lifts, and one or more than one mobile lift vehicle or lift caddy. The primary lift is located at a work position, e.g., repair bay or service bay, on a workplace floor and is configured for lifting a vehicle vertically above the workplace floor. Each primary lift can be made up of a plurality of vertical lift posts (e.g., four), each having a lift arm extending laterally from its associated lift post, and each said lift arm having a receptacle fixture therein supporting a removable vehicle lift pad, the lift post including means for raising and lowering the associated lift arm, and means for moving the associated lift arm laterally. The primary lift is configured to position each associated vehicle lift pad at a predetermined vehicle lift point on the chassis of the vehicle.

The mobile lift caddy is adapted for removing a vehicle from the primary lift while the vehicle is elevated above the workplace floor and then transporting the vehicle to another location.

In a preferred arrangement the mobile lift caddy has a chassis that is dimensioned to fit between the pairs of the vertical lift posts of the primary lift. A mobility drive arrangement on the chassis is suitably configured for moving the caddy under operator control to and from the workplace location of the primary lift and between there and another location, e.g., another service bay. The caddy may have a plurality of caddy lift arms each having a portion thereof carried on the chassis of the vehicle lift caddy, and each having a receptacle member thereon configured to accept a portion of a respective one of the lift pad assemblies at the lift arms of the primary lift, when the lift pad assembly is supported in an associated one of the receptacle fixtures of the respective lift arm of the primary lift.

The caddy lift can be precisely positioned to align the receptacle members of the respective caddy lift arms with the associated lift pad assemblies. Then the lift pad assemblies are lifted out vertically from the primary lift arms and are supported on vehicle lift caddy so that the vehicle can be moved to another location.

With only minor modifications to the primary lift arms, the mobile machine or caddy can be used with exiting lift technology.

Preferably, the caddy or mobile machine is a self-powered, remotely controlled unit, with a structural frame or chassis, wheeled or tracked mobility, and a power system for working the caddy lift arms and for the mobility of the caddy and mobility. In one preferred arrangement, a rechargeable electrical system powers hydraulic pumps and independent motors, as well as electronics and one or more caddy lift arms, which can be moved by hydraulic ram or by a threaded lead screws that interact with threaded portions of the caddy lift arms for positioning each of the receptacle members of the respective caddy lift arms to align the receptacle members with the associated lift pad assemblies. This can include a pair of fore-aft linear adjustment lead screws and a pair of lateral adjustment lead screws coupled to associated threaded portions of the caddy lift arms, with precise positional adjustments. The control arrangement for mobility of the caddy and for operating the caddy lift arms can include a control module wired to the caddy or connected wirelessly. In some cases the control module may be on the chassis of the mobile caddy.

Control logic for the mobile lift caddy may be mechanical, electrical or fluid based, or a hybrid system combining these. The caddy can be operated by physically engaging the controls or by remote operation of the controls. Precise adjustment for the caddy lift arms may be accomplished in a number of ways, such as gears, lead screws, V-belts, indexed electrical motor drive, fluid powered devices, or other techniques. Positioning of the chassis lift arms in relation to the transferable lift pads on the lift arms of the primary lift can be accomplished using a vision sensor system, a proximity sensor system, or by using pre-established data related to the make and model of the customer's vehicle. The mobile machine or caddy may achieve mobility using wheel drive, a tracked drive system, sled, rails, etc. A battery-powered fluid drive is preferred as the power source for the mobility and lift functions of the lift caddy, but other power sources may be used if desired, such as electric motor drive or an internal combustion engine contained in the chassis of the lift caddy.

Straps, cages, mechanical locks, electrical locks, or other securing system may be employed for securing the vehicle onto the lift caddy for transfer from the primary lift to another location.

The removable vehicle lift pads may each include a plug member having a platform member affixed on an upper end adapted to support the vehicle at an associated one of the vehicle's lift points; The plug member may take the form of a dowel of generally square cross section, with the receptacle members of the lift arms being in the form of a socket having a generally square cross section configured to seat the square cross section dowel of an associated removable vehicle lift pad. Favorably, the receptacle members may have a cutout at a distal side thereof that extends the length of the socket. The plug member may further include a hollow finger portion extending downward from a lower end of the dowel of generally square cross section. In that case, the receptacle members of said caddy lift arms may each include a upstanding pin configured to insert into an associated hollow finger portion of a respective removable vehicle lift pad, to secure the lift pad so it can be lifted free of the primary lift arm.

In a favorable arrangement, the mobility drive arrangement of the mobile lift caddy employs left and right independent tracked mobility drives which are situated on left and right sides of the chassis. These maintain the chassis spaced above the workplace floor. Each tracked mobility drive has a drive wheel, a plurality of idler rollers, and a flexible track carried in a drive loop around the drive wheel and idler rollers. A pair of independent drive motors in the chassis are each connected to the drive wheel of a respective one of the two tracked mobility drives.

These and other objects, features, and advantages of the invention will become apparent from the following detailed description of a selected preferred embodiment, which is to be read in connection with the accompanying Drawing:

DETAILED DESCRIPTION OF THE PREFERRED EMBODIMENT

Figure 1:
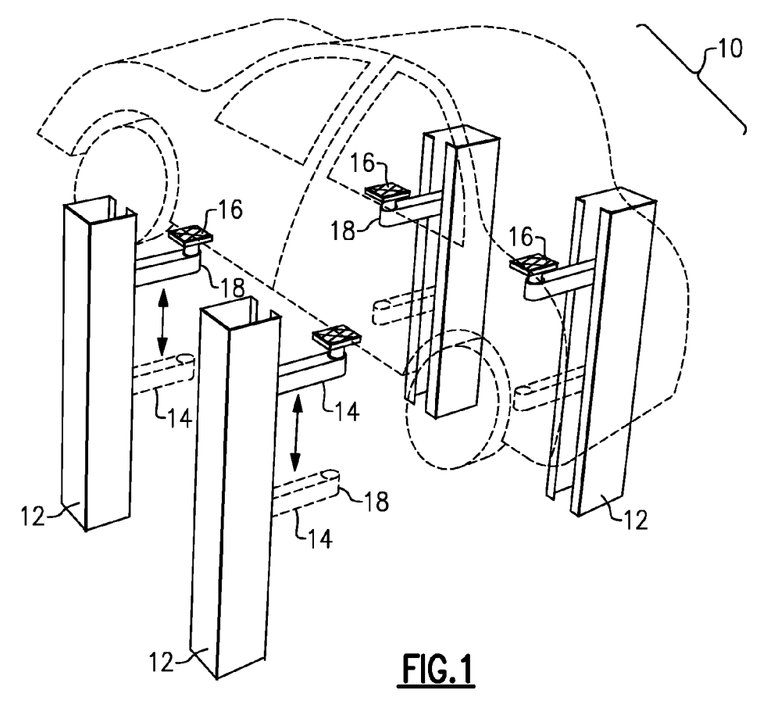
FIG. 1 is a perspective view of a fixed primary lift or hoist that may incorporate or be adapted to incorporate features of this invention.
Figure 2:
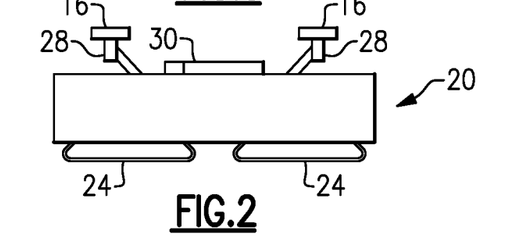
FIGS. 2 and 3 are a side elevation and a top plan view of a mobile lift caddy according to one embodiment of the invention.
Figure 3:
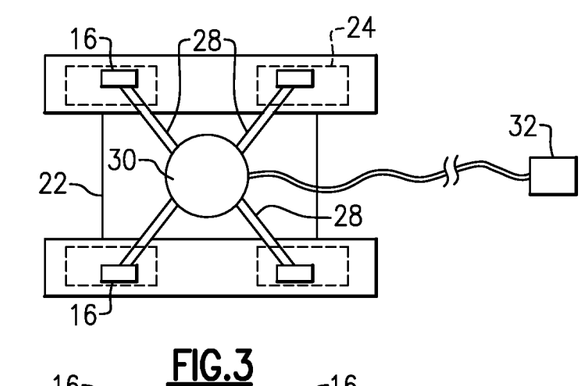
Figure 4:
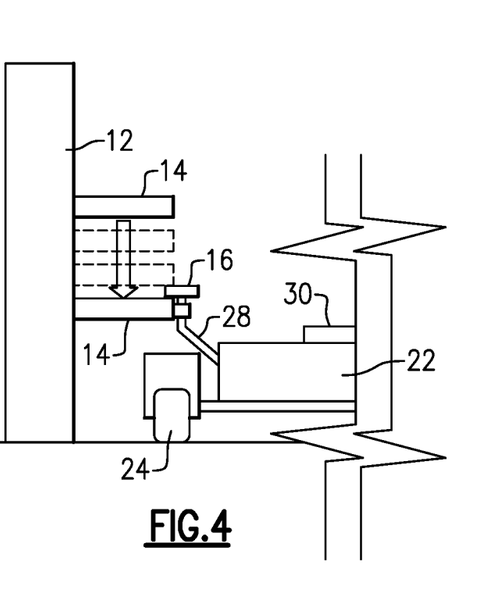
FIG. 4 is a view from a proximal side of the primary lift illustrating interaction of the primary lift and the mobile lift caddy of this embodiment.

With reference to the Drawing Figures, and initially to FIG. 1, an automotive repair shop typically employs one or more primary lifts 10, positioned within a respective service bay for the purpose of lifting a vehicle above the floor of the repair bay to facilitate repair or maintenance of the vehicle. As shown, a typical primary or permanent lift 10 has four lift posts 12 that define the workspace around the vehicle, with each lift post 12 having a lift arm 14 that can be extended to position itself under the vehicle. There are lift pads 16 at the distal or outer ends of the lift arms, and these are to be positioned at predetermined lift points on the body or chassis of the vehicle so it can be lifted. In the embodiments of this invention, the lift pads 16 are replaceable and interchangeable, and can be removed from associated sockets or receptacles 18, as discussed later. While not shown here, there are hydraulic cylinders or equivalent actuator mechanisms in each of the lift posts 12 for moving the lift arms 14 between lowered and elevated positions. In keeping with the principles of this invention, a mobile lift caddy 20 is provided as illustrated, e.g., in FIGS. 2, 3, and 4. The lift caddy 20 has a main body or chassis 22 that is dimensioned to fit into the space defined by the primary lift posts 12, and has a mobility drive arrangement 24, which can be a tracked drive or wheel drive. The mobile lift caddy 20 has a set of four lift arms 28 which emanate from a lift arm control, e.g., a cylindrical turret 30 in this example; each of these caddy lift arms 28 is configured so as to accept a mating portion of the lift pads 16 on the primary lift arms and lift out the lift pads 16 with the vehicle being supported on them, so that the vehicle can be transported on the caddy to another location, which can be another repair bay or can be a holding area. Also shown here is a caddy control module 32, i.e., a hand-held module that is connected (in this example) by a cable to the chassis of the caddy. This can be used by the repair worker to manipulate and to raise and lower the caddy lift arms 28, and to control the mobility drive 24 to move the caddy 20 into and out of the repair bay. In other embodiments, the control module may be wirelessly connected, or may be incorporated into the chassis 22 of the mobile lift caddy.

Figures 5, 6, 7:
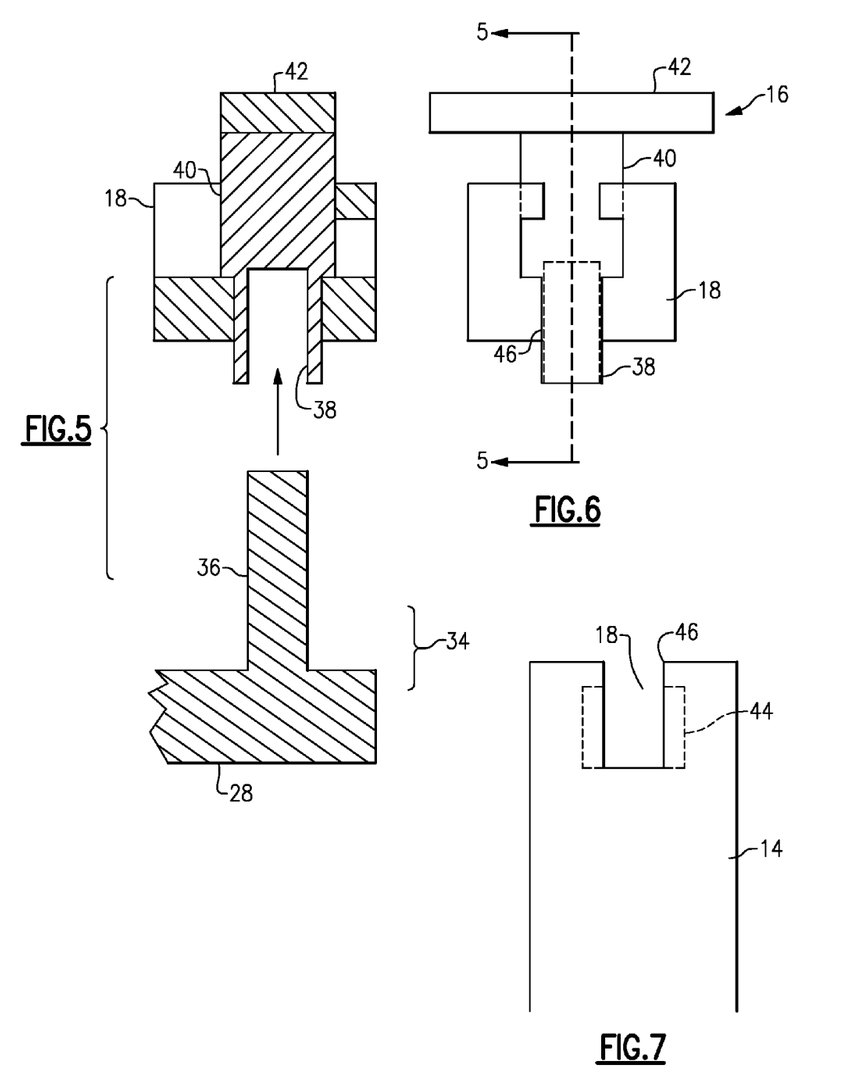
FIG. 5 is a sectional view of the replaceable lift pad and receptacle therefor, and further showing a possible embodiment of the receptacle portion of the caddy lift arm, according to this embodiment, the view being taken at 5-5 of FIG. 6.
FIG. 6 is an end view of the lift arm of the primary lift and associated lift pad of this embodiment.
FIG. 7 is a top plan view of a portion of the lift arm of the primary lift, of this embodiment.

As explained with reference to FIGS. 5, 6, and 7, the receptacles or sockets 18 and the cooperating removable lift pads 16, are be constructed such that the lift pads 16 are securely held in place in the primary lift arms but can be lifted out vertically by the receptacles of the caddy lift arms 28. In this example, at the distal end of the caddy lift arm 20 is a receptacle portion 34, which can include an upstanding pin 36 to fit into an open core 38 of a vertical projecting finger portion of a square dowel or plug 40 of the lift pad 16. This plug 40 supports a pad or support plate 42, that supports the lift point of the vehicle. The receptacle 18 of the primary lift arm 14 has a square-profile void 44 that mates with the square plug 40 as shown, and also has an open slot or passage 46 at the distal end to permit the caddy lift arm to pass through and remove the lift pad 16. Other possible arrangements of the lift pad 16 and the receptacles of the primary lift arm and caddy lift arm are possible as well to achieve this result.

Figure 8:
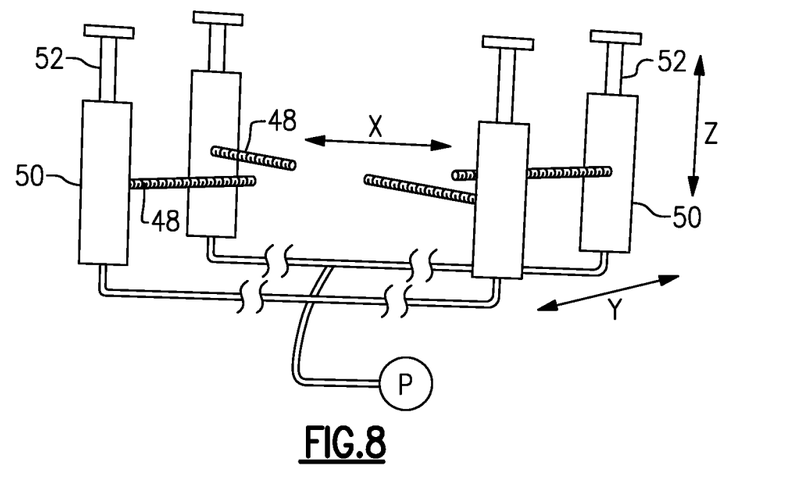
FIG. 8 is a schematic arrangement of lift arms of the mobile lift caddy.

FIG. 8 is a general schematic view of a mechanical and hydraulic system for operating the caddy arms 28 of the mobile lift caddy. In this example, there are radial lead screws 48, 48, e.g., threaded rods, that can move the associated caddy lift arms 28 outward or inward, radially. There may also be a mechanism (not shown) within the control turret 30 for changing the angular relationship of the caddy arms relative to the caddy chassis. For each arm, a hydraulic actuator 50 has a rod 52 connected with the associated caddy lift arm for raising it or lowering it. A typical hydraulic circuit is shown here with a pump P and hydraulic lines.

Figure 9:
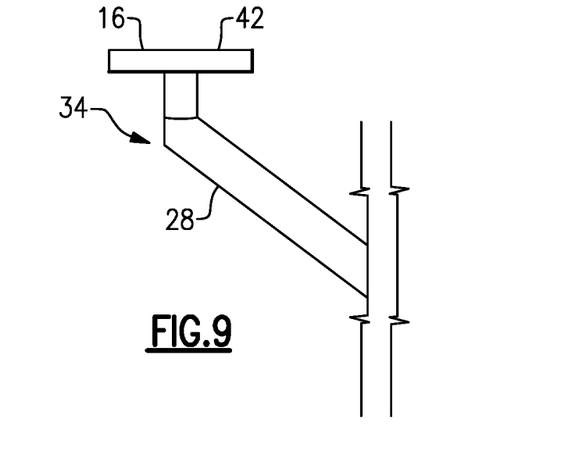
FIG. 9 is partial elevation of one version of a caddy lift arm.

In one preferred arrangement as shown in FIG. 9, the caddy arms 28 angle upward from the chassis (not shown here) of the caddy, to support an associated removable lift pad 16 on its lift pad receptacle 34.

Figure 10:
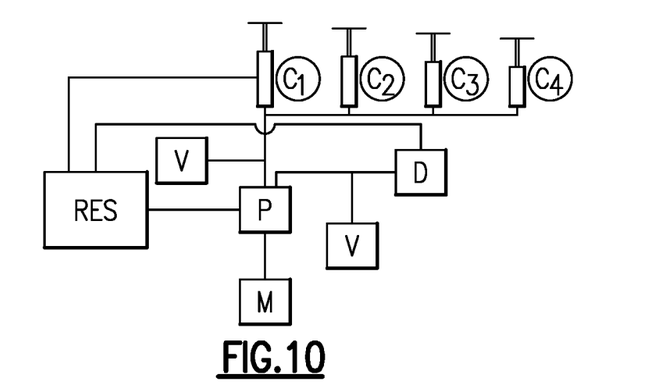
FIG. 10 is a schematic diagram of a possible hydraulic drive operation of the lift caddy.

The hydraulic drive circuit for this embodiment may be configured generally as shown in FIG. 10, with an electric motor M driving a hydraulic pump P, and hydraulic lines passing to a mobility drive hydraulic motor D and to the respective lift arm actuators, and returning from these elements to a hydraulic reservoir RES. Valves V, operated by the control module 32, are schematically illustrated here for the hydraulic actuators and for the mobility drive D. It should be understood that the mobility drive D can be operated in forward and reverse directions, and there would be a hydraulic motor for each of the left- and right-side mobility drives 24.

Figure 11:
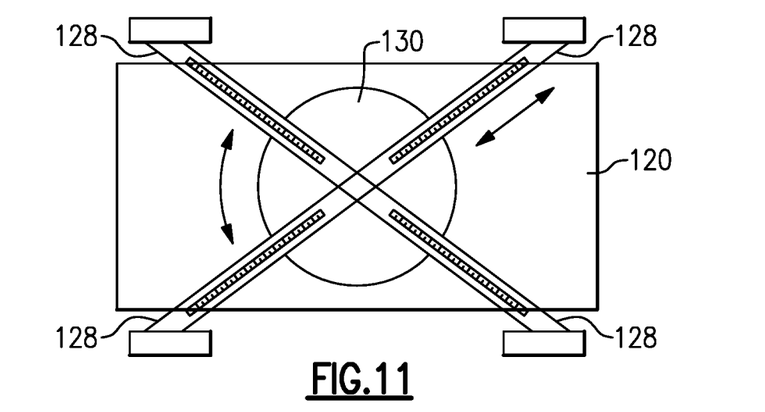
FIG. 11 is a top view of a version of the lift caddy employing lead screw members.
Figure 12:
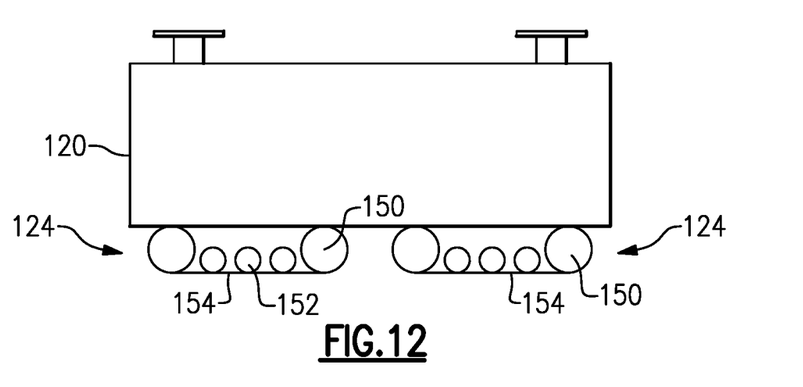
FIG. 12 is a side elevation thereof.

An alternative caddy arrangement 120 is shown here in FIGS. 11 and 12, with a turret 130 in the chassis of the unit from which the four lift arms 128 emanate. The lift arms each have a respective lead screw. Here the caddy 120 has a pair of track drives 124 on each of the left and right sides (although only one side is shown here). Each track drive includes a main drive wheel 150 and several idler wheels 152, which define the loop over which a track or belt 154 passes.

Figure 13:
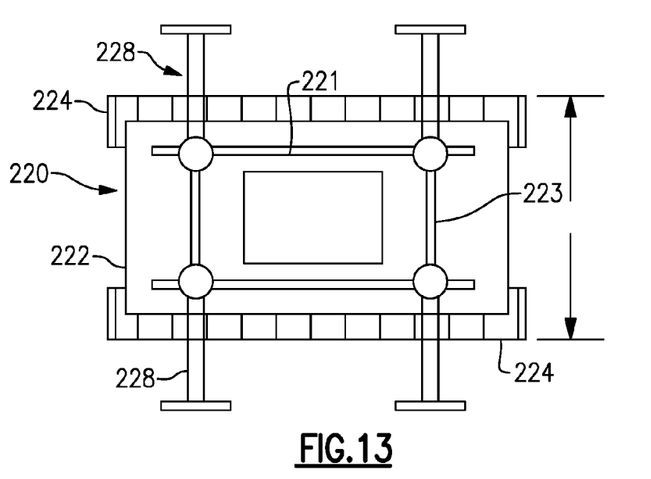
FIG. 13 is a top view of another version of the lift caddy with both fore-aft and lateral lead-screw adjustment and a track drive.
Figure 14:
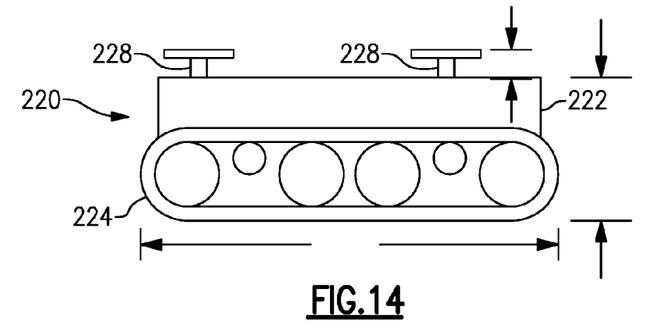
FIG. 14 is a side view thereof.
Figure 15:
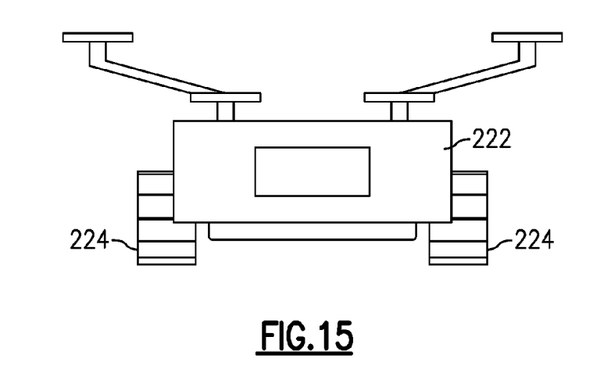
FIG. 15 is an end view thereof.
Figure 16:
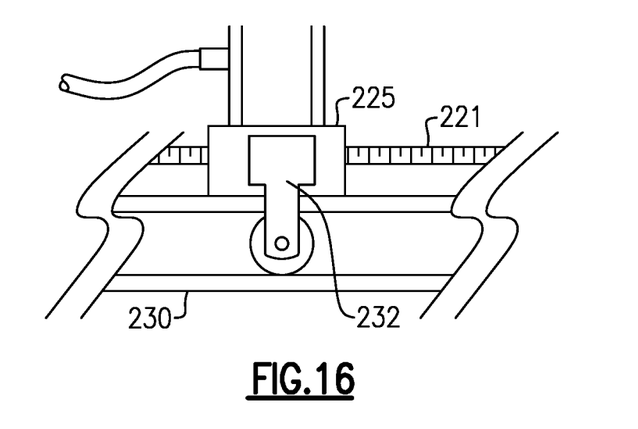
FIGS. 16 and 17 schematically illustrate portions of the lead screw drives incorporated into embodiments of the invention.
Figure 17:
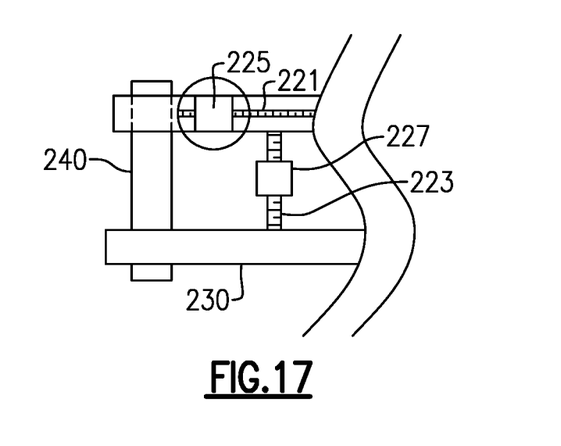
Figure 18:
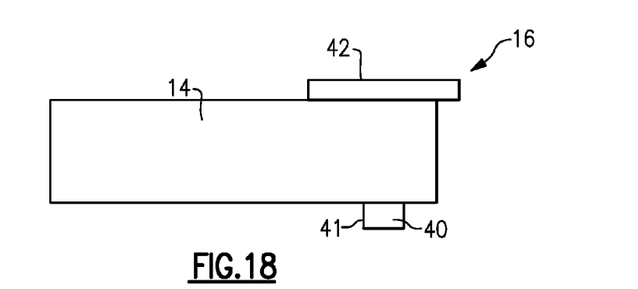
FIG. 18 is a side view of the end portion of the lift arm of the primary lift.

Another possible embodiment of the lift caddy 220 is shown in FIGS. 13, 14 and 15. Here the chassis 222 has a pair of fore-aft linear adjustment lead screws 221 and a pair of lateral adjustment lead screws 223 to move the lift arms 228 to align them with the lift pads 16 on the primary lift. A single track mobility drive 224 is provided on each side of the chassis. A hydraulic mechanism 225 for providing motion of the lift arm 228 relative to the fore-aft lead screw 221 can be provided as shown in FIG. 16, and another mechanism 227 for lateral adjustment relative to the lead screw 223 in FIG. 17. An I-beam frame member 230 (FIG. 16) in the caddy chassis provides a track for movement of an adjustment screw and bracket 232 and this can support the load on the associated caddy lift arm. The wheel rides on the web or flange of the I-beam 230. A similar arrangement can be provided on a transverse beam 240 in FIG. 17. Stepper motor control can be used for each of the lead screws.

Figure 19:
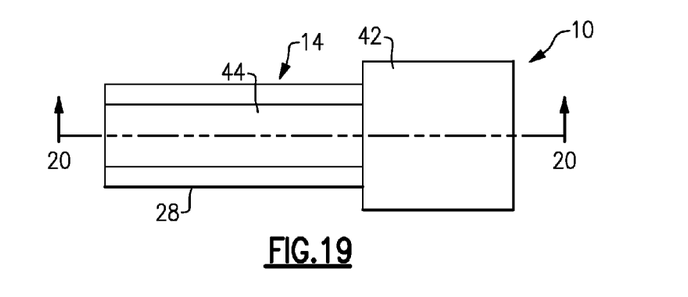
FIG. 19 is a top plan view thereof.
Figure 20:
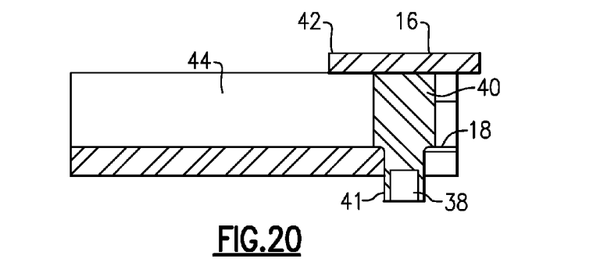
FIG. 20 is a sectional view thereof taken at 20-20 of FIG. 19.
Figure 21:
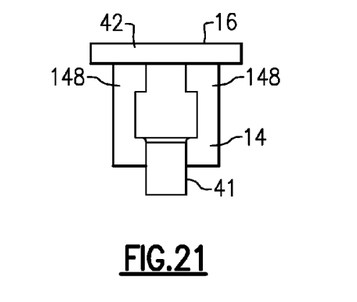
FIG. 21 is an end view thereof.
Figure 22:
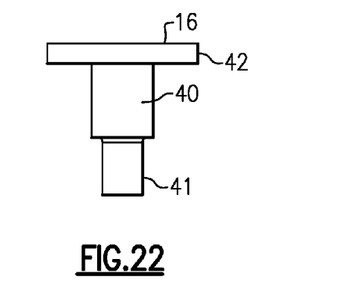
FIG. 22 is an elevation view of the replaceable lift pad of an embodiment of the invention.
Figure 23:
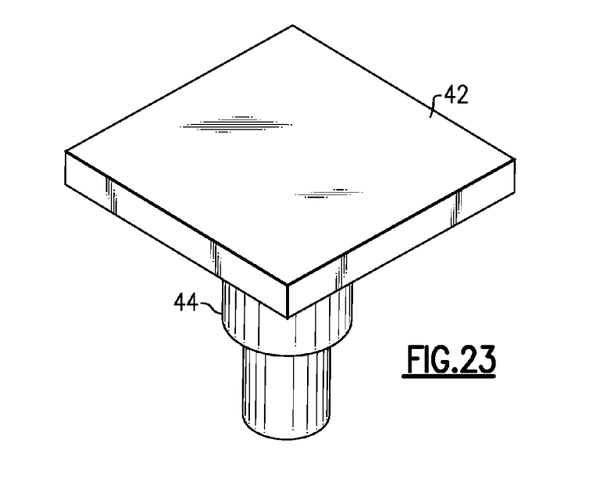
FIG. 23 is a perspective thereof.
Figure 24:
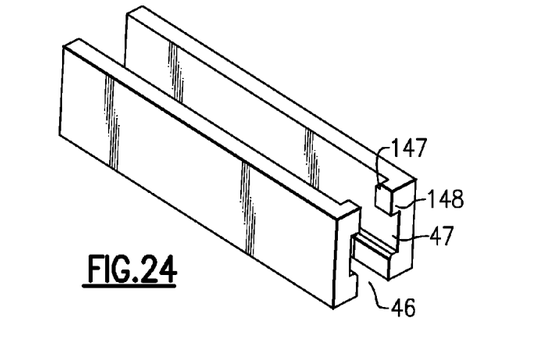
FIG. 24 is a perspective view of the end portion of the lift arm.
Figure 25:
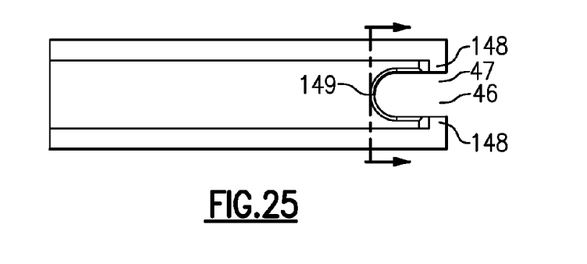
FIG. 25 is a top plan view thereof.
Figure 26:
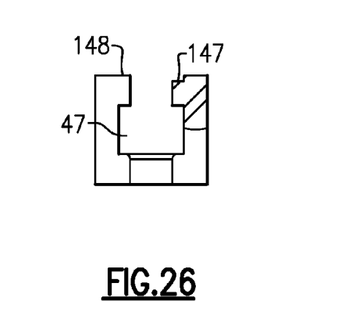
FIG. 26 is an end view thereof, with a portion partially shown cut away.
Figure 27:
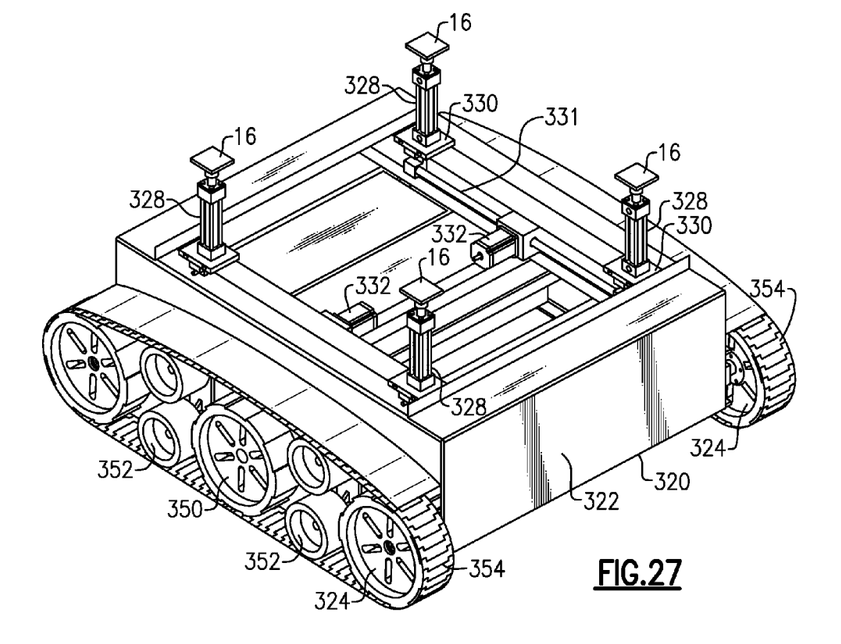
FIG. 27 is a detailed perspective view of a mobile lift caddy of an embodiment of this invention.
Figure 28:
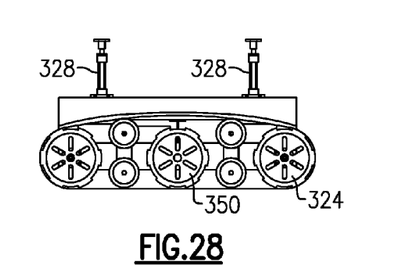
FIG. 28 is a side elevation thereof.
Figure 29:
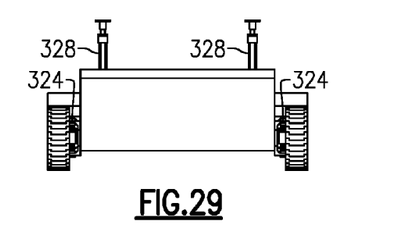
FIG. 29 is an end elevation thereof.
Figure 30:
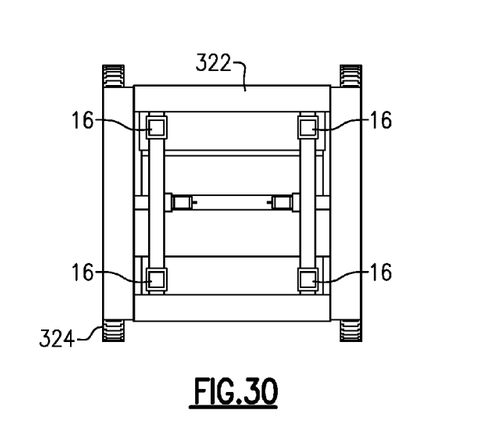
FIG. 30 is a top plan view thereof.

Details of the main or primary hoist lift arm 14 and its associated replaceable lift pad 16 can be seen in FIGS. 18 to 26. The lift pad 16 is shown in place in the receptacle portion 18 of the lift arm, with the flat square lift plate 42 supported above the lift arm 14 and with a smaller diameter portion of the dowel portion 40 of the lift pad projecting below the lift arm 14. As shown in FIGS. 19 and 20 the plug or dowel portion 40 fits into a square profile channel or void 44 in the lift arm with the portion 41 extending through a horseshoe-shaped void or passage 46 at the distal end of the arm 14, as seen in FIGS. 24, 25, and 26. The main dowel portion 40 rests on the base of the channel around the passage 46. In this example, the dowel portion 40 is shown to have a round or cylindrical shape, although that is not necessary. The distal end of the lift arm 14 is shown here to have an opening 47 at the end to permit removal of the lift pad 16 when it is being transferred to the caddy. There are inwardly directed projections 148 to block forward movement of the dowel portion 40 until it is lifted up past the projections, and in this case there is a shoulder 147 formed on the proximal side of each of these projections 148. A chamfer 149 follows the U-shaped profile and is formed along the top edge of the horseshoe-shaped cutout 46.

Another alternative caddy 320 is illustrated in FIGS. 27 to 30, here having a chassis 322 with track or belt mobility drives 324 on the left and right sides of the chassis. Each of these has one or more drive wheels 350, a number of idler wheels 352, and a track or belt 354 that extends in a loop around the drive wheels and idler wheels.

In this caddy 320, the caddy lift arms each include a vertically oriented hydraulic cylinder 328 supported on a slide plate 330 that is driven in a fore-aft direction by a lead-screw drive 331. Each lead screw drive is operated by a respective motor drive 332. The cylinders are each shown with a lift pad 16 positioned on top of a pin or rod (not shown) of the cylinder. A lateral lead-screw drive (not shown here) controls the side-to-side positioning of the respective caddy lift arms and associated lift pads 16.

Many other configurations for the lift caddy, the removable lift pads, and the receptacles at the ends of the primary lift arms and the caddy lift arms are possible without departing from the main principles of the present invention. The foregoing embodiments are presented as selected examples. The mobility drive mechanisms for the lift caddies can take on any of numerous varieties of hydraulic, electric, or other forms. While the present invention has been described with reference to certain preferred embodiments, it should be understood that the invention is not limited to any particular embodiment. Rather, many modifications and variations would present themselves to persons skilled in the art without departure from the scope and spirit of this invention, as defined in the appended claims.

I claim:

1. Vehicle lift arrangement, comprising:
   a primary lift located at a work position on a workplace floor for lifting a vehicle vertically above said workplace floor and comprising
   a plurality of vertical lift posts, each having a lift arm extending laterally from its associated lift post, and each said lift arm having a receptacle fixture therein supporting a removable lift pad assembly, the lift post including means for raising and lowering the associated lift arm, and means for moving the associated lift arm laterally and configured to position the associated lift pad assembly at a predetermined vehicle lift point on the chassis of the vehicle; and
   a mobile lift caddy adapted for removing a vehicle from the primary lift while the vehicle is elevated above the workplace floor and transporting the vehicle to another location; the mobile lift caddy including
   a chassis dimensioned to fit between a pair of said vertical lift posts of the primary lift;
   a mobility drive arrangement on said chassis configured for moving said caddy under operator control to and from said workplace location of said primary lift and between there and said other location;
   a plurality of caddy lift arms each having a portion thereof carried on the chassis of the mobile lift caddy, and each having a receptacle member thereon configured to accept a portion of a respective said lift pad assembly of each of the lift arms of said primary lift, when the lift pad assembly is supported in an associated one of the receptacle fixtures of the respective lift arm of said primary lift;
   means for positioning each of the receptacle members of the respective caddy lift arms to align the receptacle members with the associated lift pad assemblies; and
   means for raising and lowering at least portions of said caddy lift arms to raise the associated lift pad assemblies free of the lift arms of the primary lift while a vehicle is being supported on said lift pad assemblies, so that the vehicle can be transported on said mobile lift caddy to said other location.

2. Vehicle lift arrangement according to claim 1 wherein said removable lift pad assemblies each include a plug member having a platform member affixed on an upper end thereof and adapted to support the vehicle at an associated one of said vehicle lift points.

3. Vehicle lift arrangement according to claim 2 wherein said plug member is in the form of a dowel of generally square or cylindrical cross section.

4. Vehicle lift arrangement according to claim 3 wherein the receptacle members of said lift arms are in the form of a socket having a generally square cross section configured to seat the square cross section dowel of an associated removable lift pad assembly.

5. Vehicle lift arrangement according to claim 4 wherein said receptacle members have a cutout at a distal side thereof that extends the length of the socket thereof.

6. Vehicle lift arrangement according to claim 3 wherein said plug member further includes a hollow finger portion extending downward from a lower end of the dowel of generally square cross section.

7. Vehicle lift arrangement according to claim 6 wherein the a receptacle members of said caddy lift arms each include a upstanding pin configured to insert into an associated hollow finger portion of a respective removable lift pad assembly.

8. Vehicle lift arrangement according to claim 1 wherein the mobility drive arrangement of said mobile lift caddy includes left and right independent tracked mobility drives, disposed respectively on left and right sides of said chassis, and situated so as to maintain the chassis spaced above the workplace floor, each said tracked mobility drive having a drive wheel, a plurality of idler rollers, and a flexible track carried on said drive wheel and idler rollers; and a pair of independent drive motors in said chassis and each connected to the drive wheel of a respective one of said left and right tracked mobility drives.

9. Vehicle lift arrangement according to claim 8 wherein said mobile lift caddy includes a hand-held control module coupled by a flexible cable to said chassis and means for controlling said left and right drive motors from said control module.

10. Vehicle lift arrangement according to claim 1 wherein said means for positioning each of the receptacle members of the respective caddy lift arms to align the receptacle members with the associated lift pad assemblies includes a pair of fore-aft linear adjustment lead screws and a pair of lateral adjustment lead screws coupled to threaded portions of said caddy lift arms.

11. Vehicle lift arrangement according to claim 1 wherein said means for raising and lowering at least portions of said caddy lift arms includes a plurality of vertically-oriented actuators each associated with a respective one of said caddy lift arms.

* * * * *